July 20, 1954  R. G. HILL ET AL.  2,684,479
POSITION OR VOLTAGE COMPARATOR CIRCUIT
Filed Oct. 11, 1949
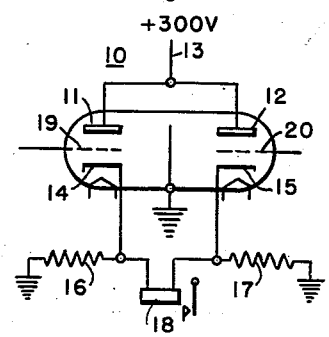
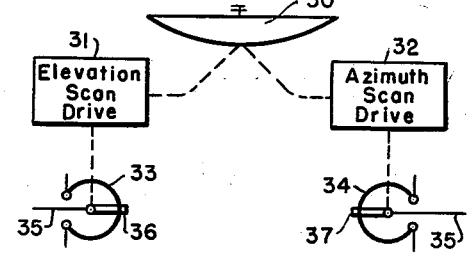
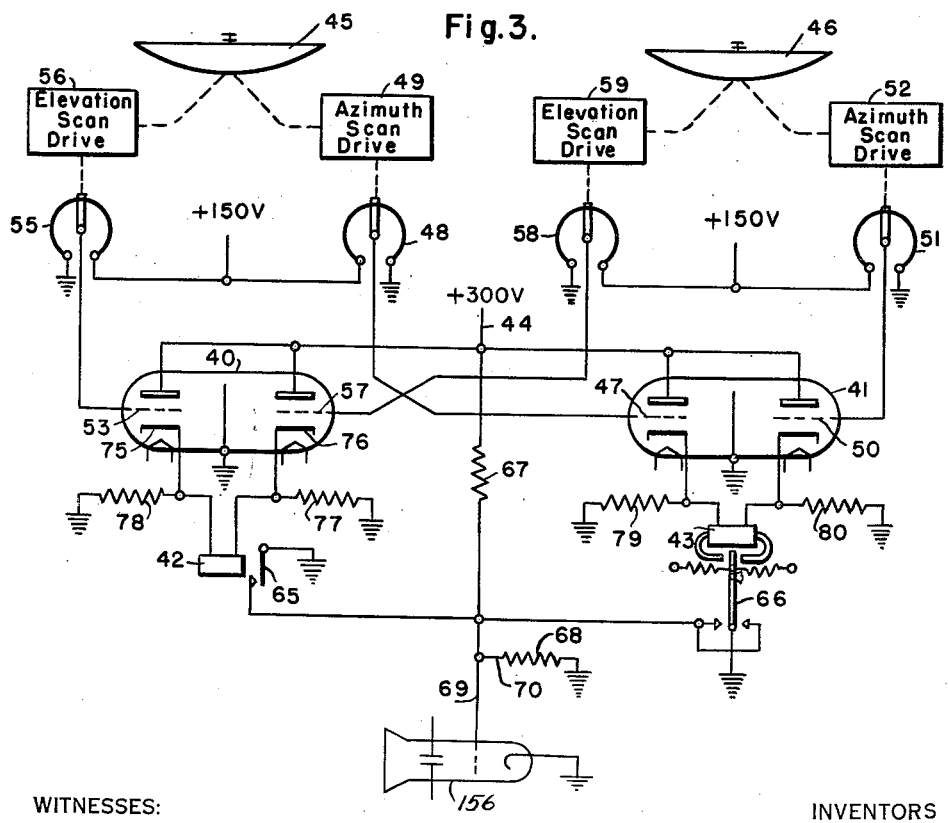
WITNESSES:
E.A. M<sup>c</sup>Closkey
Raymond G. Brodsky
INVENTORS
Richard G. Hill
and Earl H. Rix.
BY
F. E. Browder
ATTORNEY Patented July 20, 1954

2,684,479

UNITED STATES PATENT OFFICE 2,684,479

POSITION OR VOLTAGE COMPARATOR CIRCUIT

Richard G. Hill and Earl H. Rix, Glen Burnie, Md., assignors, by mesne assignments, to the United States of America as represented by the Secretary of the Navy Application October 11, 1949, Serial No. 120,626

6 Claims. (Cl. 343—100)

Our invention relates to electronic apparatus, and more particularly to a remote position comparing apparatus.

Specifically, our invention relates to a radar system, particularly for a ship or aircraft, which includes search and fire control radars. Customarily, the seach radar first uncovers a target at a given bearing and elevation. This bearing and elevation is then compared with the bearing and elevation at which the fire control radar happens to be set. In accordance with the results of this comparison the fire control radar and its associated guns are directed to the target. It is desirable that a perceptible signal be produced when the fire control radar is directed to the target uncovered by the search radar; that is, when both radar antennae are simultaneously on the target. This indication must be precise and sharp. It should occur at the instant when the antennae are both at the bearing and elevation of the target and not just before or just after the fire control antenna passes through the bearing and elevation of the other antenna.

A general object of our invention is to provide apparatus for comparing the positions of two movable objects.

An ancillary object of our invention is to provide an electronic arrangement for continuously comparing a plurality of voltages or potentials which are respectively dependent upon the positions of a plurality of objects.

An additional object of our invention is the provision of a tie-in arrangement between two or more movable antennae for the purpose of determining the respective positions thereof.

A specific object of our invention is to provide apparatus for indicating the coincidence of both the bearing and elevation of two antennae.

Another object of our invention is to provide apparatus for indicating the coincidence in a plurality of degrees of freedom of the plurality of objects.

Still another object of the invention is to provide electronic means for the constant comparison between the position of a search antenna and the position of a fire control antenna aboard a craft.

A further ancillary object is to provide a comparator for comparing voltages proportionate to the respective positions of movable members and for generating a pulse at the time of equality thereof, which pulse may be used to intensity modulate a cathode ray beam.

Other objects and advantages of the invention will be apparent during the course of the following description.

In accordance with our invention a plurality of voltages are electronically compared to give an indication visually or otherwise, when some definite relationship exists between them. The voltages are in turn proportioned or dependent upon the respective physical positions of the radar antennae or the other movable objects the positions of which are being compared. Specifically the comparison voltages are impressed in the control circuits of two sets of the cathode followers each, one set for bearing and the other set for elevation. Each set is so connected as to produce an output dependent on the difference of the currents which the followers transmit. The differential output of the cathode followers regardless of its polarity actuates a relay so long as it is appreciable. When this output is zero, the relay is unactuated. When both relays are unactuated, a signal is produced on an oscilloscope. A precise and sharp signal to indicate the coincidence in the direction of the two antennae is then produced.

In the accompanying drawings, forming a part of this specification,

Figure 1 is a schematic drawing of a duo-triode comparator tube circuit.

Fig. 2 is a schematic drawing of a movable antennae showing the potentiometer arrangement.

Fig. 3 is a schematic drawing of the combination comparator circuit with antennae.

The apparatus shown in Fig. 1, includes a twin triode vacuum tube 10, having its two plates 11 and 12 electrically connected to a common source of plate current 13. Each of the two cathodes 14 and 15 is electrically connected to ground through a resistance 16 and 17 in a cathode follower arrangement. Between the two cathodes is connected a relay member 18. The two heaters for the cathodes are electrically connected to a suitable source of heater current. The envelope and shield between sections of the tube 10 is grounded through an electrical connection from a point thereon. One of the grids 19 is connected to respond to some voltage or potential which may be applied thereto. The second grid 20 is responsive to another applied voltage or potential.

The apparatus shown in Fig. 2, includes a movable antenna 30 having drive mechanisms 31 and 32 to move the antenna 30 in elevation and in azimuth respectively. In each of the latter drive mechanisms, there are located potentiometers 33 and 34, which are arranged to give a voltage or potential proportionate to the relative position of the respective drive mechanism 31 or 32 attached thereto. One end of each of the potentiometers 33 and 34 is grounded, and the other end is energized with a direct-current reference potential. From moving contacts 36 or 37 on each of these potentiometers 33 and 34 an electrical connection 35 is made to one of the two grids 19 and 20 of Fig. 1, to impose on the latter a voltage proportionate to the relative position of the antenna member 30.

Referring to Fig. 3, two duo-triode tubes 40 and 41 are shown, each having two plates, two grids, and two cathodes. Each of these duo-triode tubes 40 and 41 is connected similar to the circuit described above with regard to Fig. 1. Each of the said tubes 40 and 41 has connected between its cathode members a relay member 42 and 43, respectively. All of the plates are connected to a common source 44 of plate current. Two radar antennae 45 and 46 are shown as the movable objects whose relative positions are to be compared. Each of these antennae are set up as described above for Fig. 2.

One of the said duo-triode tubes 41 is arranged to compare the relative azimuth positions of the compared antennae 45 and 46. The other of said tubes 40 is connected to compare the relative elevation positions of the compared antennae 45 and 46. The former tube 41 has a connection to one of its grids 47 from the voltage potentiometer 48 in the azimuth drive mechanism 49 of the radar gun laying antenna 45; the other of its grids 50 has connected to it the voltage potentiometer 51 in the azimuth drive mechanism 52 of the radar search antenna 46. The other tube 40 has connected to one of its grids 53 the potentiometer 55 in the elevation drive mechanism 56 of the radar gun laying antenna 45, and to the second of its grids 57 the potentiometer 58 in the elevation drive mechanism 59 of the radar search antenna 46 is connected.

The relay member 42 between the cathodes of the first tube 40 is an unpolarized relay, and is arranged to operate a switch 65. The relay member 43 between the cathodes of the second tube 41 is a polarized snap-acting relay, and is arranged to operate a double-throw switch 66. The two said switches 65 and 66 are connected in parallel.

Between the plate current source 44 and ground is connected a resistance 67 and another resistance 68. Each of the said switches 65 and 66 is connected to short circuit the latter said resistance 68 to ground. A connection 69 common to the above switches 65 and 66 is made from the ungrounded end 70 of this latter resistance 68 to the input of a cathode ray tube 156. Current for all of the heaters is supplied from a transformer source.

The operation of the comparator is as follows: The apparatus shown in Fig. 2 has, as one of its applications, usefulness in a radar system. A radar antenna 30 is shown, which in practice may be used to direct guns or artillery toward a target. A separate drive mechanism 31 is employed to move that antenna during a scanning movement in elevation, and another drive mechanism 32 is employed to direct that antenna throughout an azimuth scan. Geared to each of the said drive mechanisms is a linear potentiometer 33 and 34, respectively. A second radar antenna may be used in practice to search for the target to be fired upon (see Fig. 3); the latter search antenna (46 of Fig. 3) has similar drive mechanisms each with a linear potentiometer geared to it also, one for azimuth scan and one for elevation scan. One end of all the potentiometers is grounded, and the other end is energized with a direct-current potential. Moving contacts on each of these potentiometers supply potentials which are proportionate to the angular positions of its respective antenna and drive mechanism. Thusly, when the elevation angle of the one antenna is equal to the elevation angle of the other antenna, the respective voltages supplied by the potentiometers thereof are also equal. And, when the azimuth angle of the one antenna equals the azimuth angle of the other antenna, the respective voltages supplied by their potentiometers are also equal.

One purpose of the device as shown in Fig. 3 may be to compare the two proportionate azimuth voltages, and to compare the two proportionate elevation voltages; and to generate a current pulse at the time when the compared voltages are equal. This said pulse may be employed to intensity modulate a cathode ray tube beam to give an indication thereon when the two antennae 45 and 46 are in the same relative positions in space.

In operation the proportionate azimuth voltage from the one antenna 45 is applied to one of the grids 47 of the first comparator tube 41, and the proportionate azimuth voltage from the other antenna 46 is applied to another grid 50 of the same tube. The proportionate elevation voltage from the one antenna 45 is applied to one of the grids 53 of the second comparator tube 40, and the proportionate elevation voltage from the other antenna 46 is applied to another grid 57 of the same tube. These tubes 40 and 41 act as cathode followers to prevent the loading of the current sources. Resistors 77, 78 are provided in the cathode circuits of tube 40, and resistors 79 and 80 are provided in the cathode circuits of tube 41.

The general operation of each of these tubes 40 and 41 is the same, so the operation of one tube 40 will hereafter be described with the understanding that the second tube 41 generally follows in the same manner. Of course, one tube compares the azimuth positions and the other tube compares the elevation positions, but this does not affect the general individual functioning of each tube.

The tube 40 acts as a cathode follower, with the potential of each cathode higher than that of the grids with a sufficient voltage difference to equal the required grid bias. When a sufficient proportionate position voltage is applied to one of the grids 53, the part of the tube controlled by it will fire; this raises the potential of the cathode 75 of that part of the tube. When this happens the interconnecting relay coil 42 passes current from the cathode 75 at the higher potential to the cathode 76 at the lower potential to ground through the cathode resistor 77 of the other part of the tube. The potential of the latter cathode 76 will rise when the latter current passes to ground as described, and that part of the tube cannot then fire.

For purposes of explanation, assume that one of the proportionate position voltages from one of the potentiometers 58 is applied to the other grid 57 of the tube 40 concurrently to that described immediately above. This will happen in the actual practice of the invention. This will overcome the grid bias, and fire the part of the tube controlled by this second grid 57. This raises the potential of the cathode 76 of that part of the tube. When this happens, the interconnecting relay 42 passes current to the cathode 75 of the other part of the tube, and then to ground through its cathode resistor 78; this causes the potential of this second cathode 75 to rise, and cuts that part of the tube off from firing.

The net result is that the interconnecting relay member 42 is energized whenever there is an appreciable difference in the proportionate position voltages or potentials applied to the respective grids 53 and 57 of the tube 40. When these applied potentials are equal, or nearly so, the said relay 42 becomes practically deenergized, and the switch 65 controlled by it is opened. The same is true of the other comparator tube 41 and its relay controlled switch 66.

When the contacts of switches 65 and 66 controlled by the relays 42 and 43 are in the open position, the resistor 68 between ground and common to those switch contacts is not short-circuited therethrough. If this resistor 68 is not short-circuited, a potential is applied across it from the current supply 44, which results in a voltage drop across that resistor 68. A connection 69 is made across this resistor 68 to apply a current pulse to the input of a cathode ray tube. The cathode ray beam of the latter is thereby modulated to give an indication when the two compared antennae are in the same relative positions.

When the described apparatus is used in a radar application, it is more desirable to employ special relays for the respective comparator tubes. The azimuth scan movement is generally more rapid than the elevation scan movement. As a fairly high accuracy of indication is required for the comparison apparatus described, the relay member 43 between the cathodes of the azimuth position comparator tube should be more sensitive and capable of faster operation than the relay 42 in the elevation position comparator tube. Thusly, a polarized relay 43 having a snap action operation has been found best suited for use in the azimuth position comparator tube circuit. Even this relay has a slight time lag which results in an indication on the cathode ray tube which brackets the true azimuth position; but this has one advantage, as it leaves the true azimuth bearing position on the cathode ray oscilloscope free to show up any targets that are detected. The elevation scan is much slower, which makes unnecessary the requirement of the fast acting relay 43 previously described. Instead, an unpolarized relay 42 is used between the cathodes 75 and 76 of the elevation position comparator tube 40. The latter relay 42, however, is a very sensitive relay, and gives a sufficient accuracy of indication. This relay opens switch 65 into the open switch contact position when the energization level between the cathodes 75 and 76 falls below a predetermined limit.

The resultant pattern on the cathode ray oscilloscope consists of two short vertical lines which bracket the true position of the gun laying radar antenna. The pulses are generated by the switch contact action caused by the relays, and they intensity modulate the cathode ray beam of the oscilloscope.

It is to be understood that the form of the invention, herewith shown and described, is to be taken as a preferred example of the same, and that various changes may be resorted to without departing from the spirit of the invention, or the scope of the subjoined claims.

We claim as our invention:

1. In a circuit for comparing a plurality of voltage potentials, a first electric discharge device having a plurality of anodes, a plurality of cathodes and a plurality of grids, each of said anodes cooperating with one of the grids and one of the cathodes, a second electric discharge device having a plurality of anodes, a plurality of cathodes and a plurality of grids, each of the last-said anodes cooperating with one of the last-said grids and one of the last-said cathodes, a voltage source connected to each of the anodes, a first single coil relay mechanism connected between at least two of the cathodes of the first electric discharge device and responsive to voltage differences therebetween, said first relay mechanism being an unpolarized type of relay mechanism, and a second single coil relay mechanism connected between at least two of the cathodes of the second electric discharge device and responsive to voltage differences therebetween, said second relay mechanism being a polarized snap-acting type of relay mechanism.

2. In a circuit for comparing a plurality of voltage potentials, a first electric discharge device having two anodes, two cathodes and two grids, each of said anodes cooperating with one of the grids and one of the cathodes, a second electric discharge device having two anodes, two cathodes and two grids, each of the last-said anodes cooperating with one of the last-said grids and one of the last-said cathodes, impedance members respectively connected between ground and each of the above said cathodes, a first single coil relay device connected between the cathodes of the first discharge device, a second single coil relay device connected between the cathodes of the second discharge device, and a switch mechanism operated by the first and second relay devices.

3. In a circuit for determining the relative positions of a plurality of movable members, a first antenna having a horizontal drive mechanism and a vertical drive mechanism, a second antenna having a horizontal drive mechanism and a vertical drive mechanism, a first electric discharge device having a plurality of anodes, a plurality of cathodes and a plurality of grids, each of said anodes cooperating with one of the grids and one of the cathodes, a second electric discharge device having a plurality of anodes, a plurality of cathodes and a plurality of grids, each of the last-said anodes cooperating with one of the last-said grids and one of the last-said cathodes, impedance members respectively connected in series with each of the cathodes, a first potentiometer responsive to the operation of the horizontal drive mechanism of the first antenna and connected to one of the grids of the first electric discharge device, a second potentiometer responsive to the operation of the horizontal drive mechanism of the second antenna and connected to one of the grids of the second electric discharge device, a third potentiometer responsive to the operation of the vertical drive mechanism of the first antenna and connected to another of the grids of the first electric discharge device, a fourth potentiometer responsive to the operation of the vertical drive mechanism of the second antenna and connected to another of the grids of the second electric discharge device, a first single coil relay member connected between two of the cathodes of the first electric discharge device and adapted to be actuated when the last said cathodes are at different voltage potentials, and a second single coil relay member connected between two of the cathodes of the second electric discharge device and adapted to be actuated when the last said cathodes are at different voltage potentials.

4. In an electronic comparator for determining the position coincidence of two movable antennae, the combination of two dual-triode tubes each having two grids and two cathodes, resistance members respectively connected between each of said cathodes and ground, a single coil relay member connected between the cathodes of each of the tubes, a switch mechanism operated by each of the relays in response to voltage differences applied between the grids of each of the tubes, the voltage difference applied to the first of said tubes being determined by the respective elevation positions of said antenna, and the voltage difference applied to the second of said tubes being determined by the respective azimuth positions of said antennae.

5. In a circuit for determining the position coincidence of a plurality of movable members, the combination of a plurality of electric discharge devices each having at least two grids and two cathodes, each of said grids cooperating with one of said cathodes, a single coil relay respectively connected between the two cathodes of each of said discharge devices, and a switch mechanism operated by each of said relays in response to potential differences respectively applied between the two grids of each of said discharge devices in proportionate relationship to the respective positions of said movable members.

6. In a comparator for determining the relative positions of a plurality of movable members, the combination of a plurality of dual-triode tubes each having two grids and two cathodes, a plurality of single coil relay members, each of said relay members being connected between the cathodes of one of said tubes, a switch mechanism respectively operated by each of said relays in such a manner that an indication is given when all of said relays are deenergized, and a plurality of voltage potentiometers, each of the latter being connected to one of said grids to apply to its respective grid a voltage potential which is proportionate to the position of one of said movable members.

References Cited in the file of this patent

UNITED STATES PATENTS

| Number | Name | Date |
|---|---|---|
| 2,150,241 | Nichols | Mar. 14, 1939 |
| 2,185,367 | Blumlein | Jan. 2, 1940 |
| 2,231,929 | Lyman | Feb. 18, 1941 |
| 2,232,390 | Katzin | Feb. 18, 1941 |
| 2,329,073 | Mitchell | Sept. 7, 1943 |
| 2,432,826 | Smith | Dec. 16, 1947 |
| 2,434,822 | Van Beuran | Jan. 20, 1948 |
| 2,439,711 | Bovey | Apr. 13, 1948 |
| 2,452,880 | Van Beuran | Nov. 2, 1948 |
| 2,456,666 | Agate | Dec. 21, 1948 |
| 2,464,822 | Mallett | Mar. 22, 1949 |
| 2,468,350 | Sunstein | Apr. 26, 1949 |
| 2,471,872 | Hunt | May 31, 1949 |
| 2,499,349 | Ayres | Mar. 7, 1950 |
| 2,505,511 | Vogel | Apr. 25, 1950 |
| 2,512,086 | Bowen | June 20, 1950 |
| 2,541,879 | Martin | Feb. 13, 1951 |
| 2,614,227 | Bordewieck | Oct. 14, 1952 |
| 2,621,295 | Lacy | Dec. 9, 1952 |

FOREIGN PATENTS

| Number | Country | Date |
|---|---|---|
| 552,891 | Great Britain | Apr. 29, 1943 |